INVENTOR
HELMUT BAUER

United States Patent Office 3,425,441
Patented Feb. 4, 1969

3,425,441
SAFETY DEVICE FOR PROTECTION AGAINST EXCESS FLUID PRESSURE
Helmut Bauer, Basel, Switzerland, assignor to Maschinenfabrik Burckhardt A.G., Basel, Switzerland, a Swiss company
Filed Dec. 29, 1967, Ser. No. 694,625
Claims priority, application Switzerland, Jan. 12, 1967, 416/67
U.S. Cl. 137—467    8 Claims
Int. Cl. F16k 17/28, 17/168

ABSTRACT OF THE DISCLOSURE

A high pressure safety valve which through the use large cross-section flow path effects a short response time.

---

Figure 1:
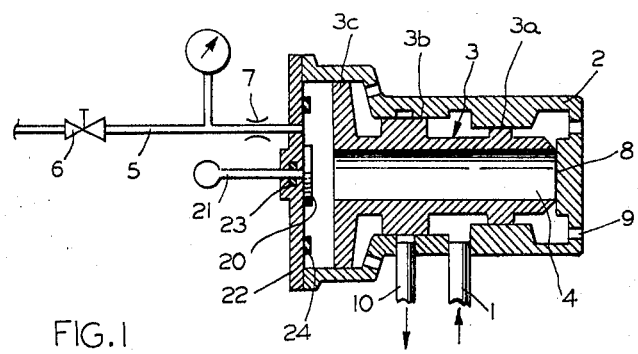

This invention relates to a safety device for protection against excess fluid pressure in a pressure chamber which with a short response time opens a large flow cross section, which does not automatically reclose and is quickly made ready for operation again by simple measures. Prior safety valves are not always able fully to satisfy such requirements as it is usually hardly possible to provide sufficient flow cross section and they require too long a response time. Furthermore a safety valve of the known kind after the overload ceases, closes again so that the pressure cannot continuously escape, which in many cases however is desirable.

The known arrangement of a bursting plate as a safety device against overloading under excess pressure has indeed the advantage that a very large flow cross-section is very quickly opened when the plate bursts, and continues to remain open. Bursting plates have the disadvantage that the bursting pressure cannot be set sufficiently accurately and testing of the safety device in operation is not possible. In addition there is the danger that after a certain time of operation, in consequence of fatigue of the material of the bursing plate, bursting can occur at a much too low pressure. Furthermore the mounting of a new bursting plate takes considerable time.

The safety device provided by the invention is particularly suitable for cases where exact response to the set response pressure and rapid opening time are necessary together with the full outflow cross section continuing to remain open.

A safety device according to the invention comprises a housing, a valve slider in the form of a stepped piston having a longitudinal bore through it slidable in the housing, and a closure member secured within the housing located in one end region thereof which with the valve slider in its extreme position towards this end region of the housing closes the end of the bore through the valve slider, an inlet for a reference pressure medium opening into the housing in the end region of the housing remote from said closure member, an outlet for the reference pressure medium opening out of the end region of the housing in which said closure member is located, an inlet for the fluid to be controlled opening into a chamber in the housing bounded between two piston steps of the valve slider, the piston step of the slider on the side of the inlet nearer said closure member being of smaller effective area than that of the piston step of the slider on the side of the inlet remote said closure member, the effective area of a piston step on the slider nearest the end region into which the inlet for reference pressure medium opens being greater than the difference in effective areas of said two piston steps, an outlet from the housing for the controlled medium located between the inlet for a reference pressure medium and the inlet for the controlled medium, the relative location of said outlet for controlled medium and said piston step of larger effective area being such that this step closes said outlet for controlled medium when the valve slider is in said extreme position but opens said outlet for controlled medium when the valve slider moves a substantial distance away from said extreme position.

Four examples of embodiment of the invention are diagrammatically illustrated in longitudinal section in FIGURES 1 to 4 respectively of the accompanying drawing.

Referring first to FIGURE 1, the fluid medium under pressure, the pressure of which is to be controlled, from a pressure chamber (not shown) and through an inlet 1, enters one end region of a slide valve housing 2 in which a valve slider 3 having a through longitudinal bore 4 and piston steps 3a, 3b and 3c is carried fluidly tightly and longitudinally slidably. Escape of the medium is prevented by the steps 3a and 3b which are a longitudinal sliding fit in respective bores in the slide valve housing 2. The step 3b has a larger diameter and therfore a larger effective area than step 3a. Accordingly the pressure to be controlled seeks to drive the slider 3 to the side of the step 3b i.e. in FIGURE 1 to the left, with a force which results from the difference in effective area between that of the larger step 3b and that of the smaller step 3a and the pressure acting on this differential area. Displacement is normally prevented by reference gas pressure supplied from a gas pipe 5 which acts on the end surface of the large step 3c and holds the slider in its extreme right hand position shown in FIGURE 1. The step 3c can be made so large that a gas under quite a low pressure e.g. a usual factory compressed air supply can be used. The value of the pressure acting on the step 3c is set by a finely regulatable pressure reducing valve 6. In addition there is also a throttle 7 adjacent the inlet 1 for the reference pressure medium.

As long as the force of the air pressure acting on the effective end surface of the step 3c exceeds the force of the pressure acting on the diffeerntial area between the steps 3b and 3a, the slider is held in the extreme right hand position by the air pressure, in which it abuts against a seating surface 8 constituting a closure member which closes the central through bore 4 in the slider 3.

If however the force acting on the differential area between the steps 3a and 3b exceeds the load produced by the action of the air pressure on the left hand end surface of the step 3c, the slider 3 is moved to the left in FIGURE 1. This causes the right hand end of the slider to retract from the seating surface 8 and at once opens a very large flow cross section and the air suddenly escapes through the openings 9 constituting an outlet from the end region in which the surface 8 is located. The air flowing out of the supply pipe 5 is so severely throttled by the throttle 7 that the air pressure loading on the end surface of the step 3c in effect suddenly disappears and the slider immediately moves to the left to its other end position. This carries the step 3b also to the left whereby the outlet 10 is opened so that the controlled medium can flow out.

With this arrangement it is easily possible to provide an adequate cross section for the flow of the controlled medium between inlet 1 and outlet 10. In addition the response time of this device can be made very short by the outlet opening for the gas which is opened by the lifting of the slider from the seating surface 8, being made correspondingly large.

It is further possible to test the functioning of the device under operating conditions by the air pressure at the regulating valve 6 being deliberately so much reduced that the device responds even under normal operating pressure.

It is desirable in many cases to decrease the very rapid response of this device somewhat and deliberately to give it a certain adjustable inertia. This is particularly of importance in the protection of pressure chambers in which short pressure peaks, e.g. pulsations, could lead to premature response. This delay in response is achieved with a modified form of the safety device which is shown in FIGURE 2 in which again the same numerals indicate the same parts.

Figure 2:
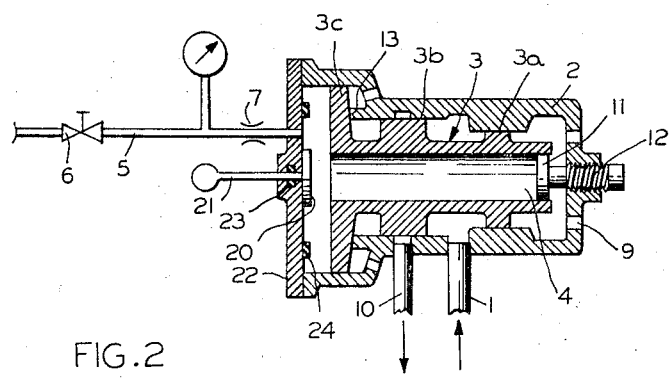

In the device according to FIGURE 2 the outflow of the pressure air which loads the end surface of the step 3c is no longer prevented by the right hand end of the slider 3 bearing against a seating surface but by a cut-off piston 11 which is a fluid-tight ground-in fit set in the bore 4 in the slider. The cut-off piston 11 can be displaced more or less into the right hand end of the bore on the slider by a screw 12 which supports it in the housing 2.

As long as the air pressure acting on the left hand end surface of the step 3c preponderates, the slider is brought into its extreme right hand end position bearing against an abutment 13. If there is a temporary rise in the pressure to be controlled the slider is moved a little to the left. There is nevertheless no immediate response. How far the piston moves to the left depends on the value of the pressure shock, its duration and the mass of the slider to be accelerated.

Operation of the overload safety device that is opening of the gas outlet does not occur if the movement is so small that the slider bore closed by the piston 11 is not opened.

If however the gas pressure of the medium in the inlet 1 acts for a longer time the slider is moved further to the left and the piston 11 opens the bore in the slider. The gas then escapes suddenly and the slider immediately opens the outlet 10.

It will be clear from FIGURE 2 that the desired inertia of the overload safety device is adjustable. The further the piston 11 is moved into the slider by means of the screw 12 when the slider is in its extreme position, the greater will be the inertia of the device. With the overload safety device provided with the adjustable piston 11 of FIGURE 2 it is no longer necessary to make the response pressure higher than the maximum pressure arising during a working cycle, and the response pressure can be set somewhat higher than the mean maximum pressure arising in a cycle because a brief rise above this pressure will no longer lead to operation of the device. The accuracy of response can thereby be increased.

Figure 3:
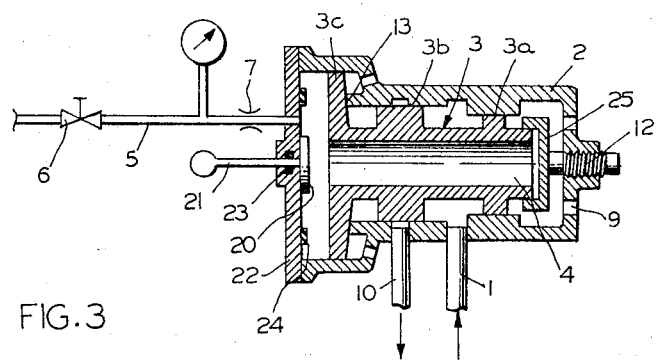

The same effect as in FIGURE 2 can according to FIGURE 3 also be produced if instead of the piston 11 projecting into the right hand end of the bore in the slider when it is in its extreme position, a cap 25 is provided having a fluid-tight sliding fit over the outer wall of the right hand end portion of the slider, and which again can be adjusted by the screw 12.

The safety devices diagrammatically illustrated in FIGURES 1 and 2 can also be so constructed that by means of the device two pressure chambers which are under a periodically alternating pressure e.g. in double acting hydraulic cylinders, the two ends of the cylinder, can be simultaneously protected against pressure rise in the manner described.

Figure 4:
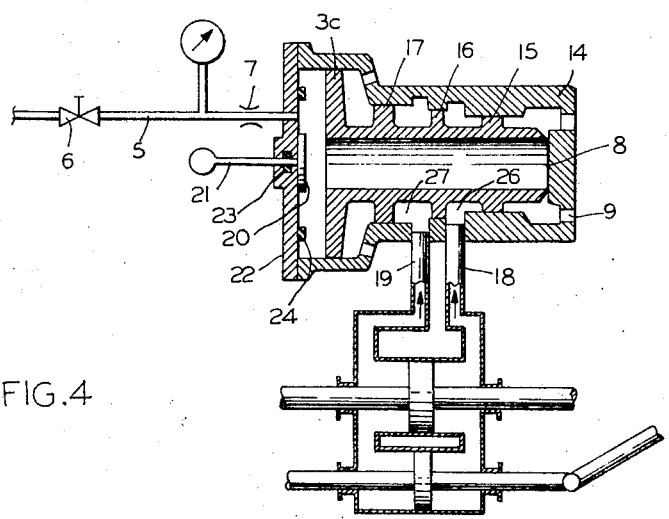

Such a device is diagrammatically illustrated in FIGURE 4.

As in FIGURE 1 the slider 3 fitted into the slider housing 14 is moved to the extreme right hand end position by the action of the air pressure loading the left hand end face of the step 3c and thus abuts the seating surface 8. The slider is however provided with three easily longitudinally moved inset sealing steps 15, 16 and 17, all of different diameters. Between the steps 15 and 16 acts the pressure which e.g. reigns at one end of a double acting hydraulic cylinder and which is supplied through the passage 18. Between the steps 16 and 17 acts the pressure which reigns at the other end of the double acting cylinder, which is admitted through the passage 19. If the diameter of the steps 15, 16 and 17 is such that the effective area determined by the smallest and next larger steps 15 and 16 is equal to the effective area determined by the next larger and largest steps 16 and 17, the force with which the pressure which displaces the slider to the left will be the same whether the pressure is admitted through the passage 18 or the passage 19, so that either can serve as an inlet.

As long as the force exerted by this pressure is less than the force of the air pressure against the end surface of the step 3c the safety device remains closed. If however the action of the pressure medium preponderates the slider is moved to the left and a large flow cross section is opened at the abutment surface 18 so that the pressure loading on the closing piston 3c suddenly disappears and the slider moves completely into its left hand end position under the action of the pressure medium. In this position a connection between the passages 18 and 19 is established so that the piston in the double-acting cylinder is instantly stopped.

It will be clear that the overload safety device shown in FIGURE 4 can also be provided with means as shown in FIGURE 2 or in FIGURE 3 for deliberately adjusting the inertia.

A separate externally accessible restoring means is operated to close the outlet when pressure no longer reigns in the inlet 1. This means can e.g. consist of a plate 20 with an axial rod 21 which is longitudinally slidable through the cover 22, sealed by a packing 23 of known kind. The slider is thus moved by hand from its left hand end position to the right until the right hand end abuts against the seating surface 8 (FIGURE 1) or until the slider bears against the abutment 13 (FIGURE 2) when the piston 11 carried by the screw 12 projects into the right hand end of the bore in the slider.

In order to damp any blow of the end surface of the slider against the internal flange 22 is the housing upon sudden disappearance of the air pressure loading, caused by the rapid movement of the slider to the left, suitable elastic damping elements 24 e.g. plates of rubber or the like, are provided in the slider or the flange 22.

The described devices can be used both for liquid and for gaseous or vaporous media.

What I claim is:

1. A safety device for protection against excess fluid pressure in a pressure chamber comprising a housing, a valve slider in the form of a stepped piston having a longitudinal bore through it slidable in the housing, and a closure member secured within the housing located in one end region thereof which with the valve slider in its extreme position towards this end region of the housing closes the end of the bore through the valve slider, an inlet for a reference pressure medium opening into the housing in the end region of the housing remote from said closure member, an outlet for the reference pressure medium opening out of the end region of the housing in which said closure member is located, an inlet for the fluid to be controlled opening into a chamber in the housing bounded between two piston steps of the valve slider, the piston step of the slider on the side of the inlet nearer said closure member being of smaller effective area than that of the piston step of the slider on the side of the inlet remote said closure member, the effective area of a piston step on the slider nearest the end region into which the inlet for reference pressure medium opens being greater than the difference in effective areas of said two piston steps, an outlet from the housing for the controlled medium located between the inlet for a reference pressure medium and the inlet for the controlled medium, the relative location of said outlet for controlled medium and said piston step of larger effective area being such that this step closes said outlet for controlled medium when the valve slider is in said extreme position but opens said outlet for controlled medium when the valve slider moves a substantial distance away from said extreme position.

2. A safety device according to claim 1 in which said closure member is in the form of a seating surface rigid with said housing.

3. A safety device according to claim 1 in which said closure member is in the form of a closure piston projecting into the bore in said valve slider when the latter is in said extreme position.

4. A safety device according to claim 1 in which said closure member is in the form of a cap having a fluid tight sliding fit over an end portion of said valve slider when the latter is in said extreme position.

5. A safety device according to claim 1 in which said closure memhber is carried by screw means wereby its position in relation to said housing is adjustable in the direction of the bore in said valve slider.

6. A safety device according to claim 1 wherein said valve slider has three piston steps defining two chambers, said three piston steps being of successively greater effective area in a direction towards said end region into which the opening for a reference pressure medium opens, the difference in effective area of the smallest and next larger of said three steps being equal to the difference in effective areas of the next larger and largest of said three steps, two passages opening through the wall of said housing into said two chambers in the said extreme position of said slider so that said next larger step separates said two passages but positioned so that when slider moves substantially away from said extreme position, said two passages are connected together through one of said chambers, either of said two passages serving as the inlet for the controlled medium and the other then serving as the outlet for the controlled unit.

7. A safety device according to claim 1 further comprising an externally accessible return means positioned so that when actuated from inside it pushes said valve slider into said extreme position in which said closure means closes the bore in said slider.

8. A safety device according to claim 1 also comprising damping means positioned to damp any blow of said slider is moved away from said extreme position.

References Cited

UNITED STATES PATENTS

| 869,731 | 10/1907 | Ricardson | 137—494 XR |
| 3,311,124 | 3/1967 | Gates | 137—467 XR |

U.S. Cl. X.R.

137—494.

HAROLD W. WEAKLEY, *Primary Examiner.*